US012190050B2

(12) United States Patent
Dodov

(10) Patent No.: US 12,190,050 B2
(45) Date of Patent: Jan. 7, 2025

(54) INK DATA MODIFICATION METHOD, INFORMATION PROCESSING DEVICE, AND PROGRAM THEREOF

(71) Applicant: Wacom Co., Ltd., Saitama (JP)

(72) Inventor: Lachezar Sashov Dodov, Sofia (BG)

(73) Assignee: Wacom Co., Ltd., Saitama (JP)

(*) Notice: Subject to any disclaimer, the term of this patent is extended or adjusted under 35 U.S.C. 154(b) by 71 days.

(21) Appl. No.: 17/903,804

(22) Filed: Sep. 6, 2022

(65) Prior Publication Data
US 2022/0415070 A1  Dec. 29, 2022

Related U.S. Application Data

(63) Continuation of application No. PCT/JP2021/006084, filed on Feb. 18, 2021.

(30) Foreign Application Priority Data

Apr. 27, 2020  (JP) ................. 2020-078718

(51) Int. Cl.
*G06F 40/171* (2020.01)
*G06F 3/04883* (2022.01)
(Continued)

(52) U.S. Cl.
CPC ........ *G06F 40/171* (2020.01); *G06F 3/04883* (2013.01); *G06F 40/232* (2020.01);
(Continued)

(58) Field of Classification Search
CPC .. G06F 40/232; G06F 40/171; G06F 3/04883; G06V 30/347; G06V 10/98; G06V 30/18076; G06V 30/387
See application file for complete search history.

(56) References Cited

U.S. PATENT DOCUMENTS 5,412,771 A * 5/1995 Fenwick ............... G06F 40/109
345/468
9,880,990 B2 * 1/2018 Zitnick, III ............ G06V 30/32
(Continued)

FOREIGN PATENT DOCUMENTS

JP  2012-520492 A  9/2012
JP  2019-036366 A  3/2019
WO  2010150916 A1  12/2010

OTHER PUBLICATIONS

International Search Report, mailed Apr. 20, 2021, for Japanese Application No. PCT/JP2021/006084, 3 pages.
(Continued)

*Primary Examiner* — Doon Y Chow
(74) *Attorney, Agent, or Firm* — Seed IP Law Group LLP

(57) ABSTRACT

An ink data modification or correction method, and an information processing device and a program for implementing the method are provided, which allow automatic correction of ink data including a spelling error in a handwritten character string. An ink data modification method according to the present disclosure includes determining a modification method of ink data by detecting a spelling error included in a handwritten character string represented by the ink data, and modifying the ink data by manipulating the ink data on the basis of the determined modification method. For example, the determined modification method may be to add a missing character, or to delete a superfluous character, or to correct a typo by replacing an erroneous character with a correct character.

15 Claims, 9 Drawing Sheets

(51) Int. Cl.
*G06F 40/232* (2020.01)
*G06V 10/98* (2022.01)
*G06V 30/18* (2022.01)
*G06V 30/32* (2022.01)

(52) U.S. Cl.
CPC ........ *G06V 10/98* (2022.01); *G06V 30/18076* (2022.01); *G06V 30/347* (2022.01); *G06V 30/387* (2022.01)

(56) References Cited

U.S. PATENT DOCUMENTS

| | | | | |
|---|---|---|---|---|
| 10,387,721 | B2* | 8/2019 | Locker | G06F 3/04883 |
| 10,783,323 | B1* | 9/2020 | Hawkes | G16H 10/60 |
| 11,086,515 | B2* | 8/2021 | Lee | G06F 3/04886 |
| 2004/0148577 | A1* | 7/2004 | Xu | G06F 3/04883 |
| | | | | 715/268 |
| 2006/0126946 | A1* | 6/2006 | Denoue | G06V 30/32 |
| | | | | 382/229 |
| 2007/0025618 | A1* | 2/2007 | Lin | G06V 30/347 |
| | | | | 382/186 |
| 2020/0019306 | A1 | 1/2020 | Angelov et al. | |

OTHER PUBLICATIONS

Extended European Search Report, dated Jul. 7, 2023, for European Patent Application No. 21796961.7. (10 pages).

Nguyen, et al., "OCR Error Correction for Unconstrained Vietnamese Handwritten Text," Proceedings of the Tenth International Symposium on Information and Communication Technology, Ha Noi, Ha Long Bay, Vietnam, Dec. 4-6, 2019, pp. 132-138.

Nguyen et al., "OCR Error Correction for Unconstrained Vietnamese Handwritten Text," The Tenth International Symposium on Information and Communication Technology (SoICT 2019), Dec. 4-6, 2019, Hanoi—Ha Long Bay, Viet Nam, ACM, New York, NY, USA. (8 pages).

* cited by examiner

FIG.5A patent aplication

FIG.5B patent ap lication

X+a

FIG.5C patent application

101

X

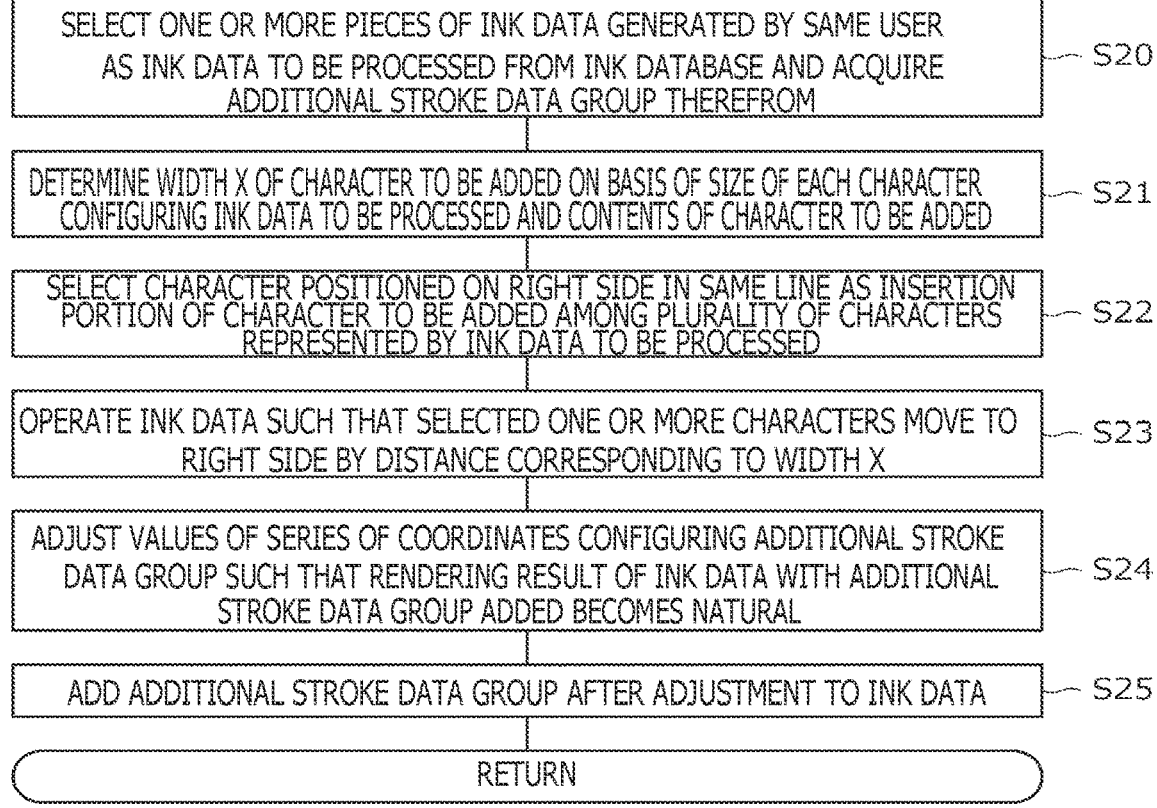
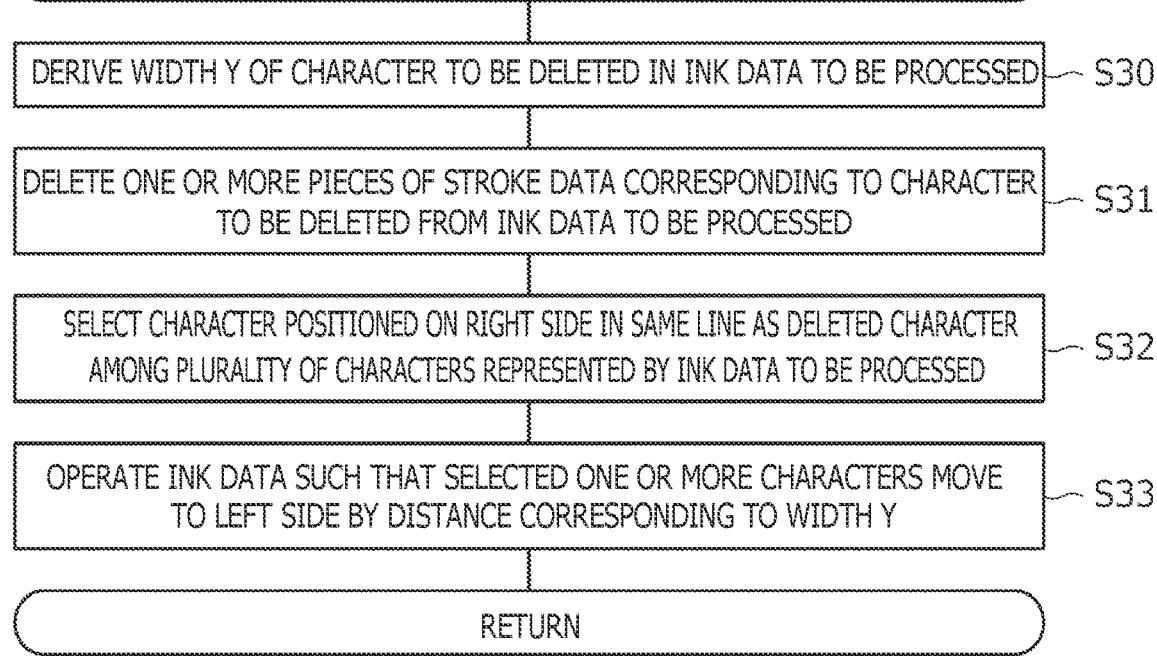

INK DATA MODIFICATION METHOD, INFORMATION PROCESSING DEVICE, AND PROGRAM THEREOF

TECHNICAL FIELD

The present disclosure relates to an ink data modification method, an information processing device, and a program thereof, and particularly to a modification method of ink data representing a character string, and an information processing device and a program that realize such modification method.

BACKGROUND ART

Digital handwriting has become increasingly popular with an increase in the number of information processing devices (smartphones, tablet terminals, laptop personal computers (PCs), and the like) that support input by a stylus. The use of digital handwriting makes it possible to realize operations that could not be realized by conventional handwriting on a sheet of paper, such as reproducing the writing in the writing order or referencing using the speed of handwriting as a feature quantity.

When inputting with a stylus, an information processing device is configured to generate ink data including one or more pieces of stroke data. The stroke data is data including a series of coordinates indicating the trace of the designated position of the stylus after the pen tip of the stylus comes into contact with a touch surface until the pen tip is removed from the touch surface. For example, in a case where a user inputs a character string with a stylus, an information processing device generates stroke data for each stroke and stores the same in a storage unit as a series of ink data. The ink data thus generated eventually becomes data representing a character string input by the user. Patent Document 1 discloses an example of such ink data.

PRIOR ART DOCUMENT

Patent Document

Patent Document 1: Japanese Patent Laid-open No. 2019-036366

SUMMARY

Technical Problem

When a user inputs a character string by handwriting, it is possible that a spelling error occurs such as a missing character, a superfluous character, or a typo. Since this kind of spelling error is naturally reflected in the character string represented by the ink data, in a case where a spelling error is included in a handwritten character string represented by the ink data, it is desirable that the information processing device automatically detect the error and modify or correct the ink data.

Thus, one of the objects of the present disclosure is to provide an ink data modification method, an information processing device, and a program that can automatically modify ink data including a spelling error.

Technical Solution

An ink data modification method according to the present disclosure is a method of modifying ink data corresponding to a handwritten character string. The method includes a determination step of determining a modification method of ink data by detecting a spelling error included in a handwritten character string represented by the ink data, and a modification step of modifying the ink data by manipulating the ink data on the basis of the modification method.

An information processing device according to the present disclosure is an information processing device including a modification method determination unit that determines a modification method of ink data by detecting a spelling error included in a handwritten character string represented by the ink data, and a modification operation unit that modifies the ink data by manipulating the ink data on the basis of the modification method.

A program according to the present disclosure is a program that causes an information processing device to function as a modification method determination unit that determines a modification method of ink data by detecting a spelling error included in a handwritten character string represented by the ink data, and as a modification operation unit that modifies the ink data by manipulating the ink data on the basis of the modification method.

Advantageous Effects

According to the present disclosure, it is possible to automatically modify ink data corresponding to a handwritten character string including a spelling error.

BRIEF DESCRIPTION OF DRAWINGS

FIGS. 5A-5C are diagrams each illustrating manipulation of ink data to correct for a missing character.

FIG. 9 is a flowchart depicting details of a character addition process depicted in FIG. 8.

FIG. 10 is a flowchart depicting details of a character deletion process depicted in FIG. 8.

DETAILED DESCRIPTION

Hereinafter, an embodiment of the present disclosure will be described in detail with reference to the accompanying drawings.

Figure 1:
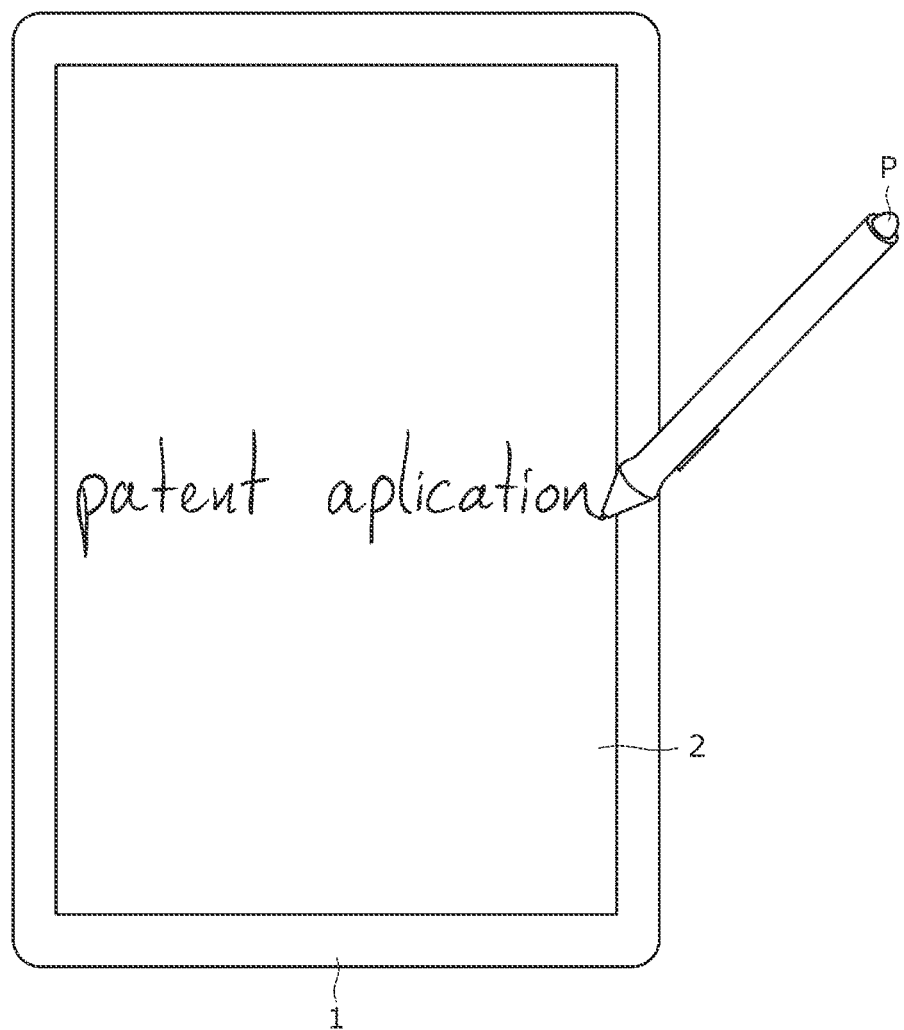
FIG. 1 is a diagram depicting an example of a configuration and a use state of a tablet terminal 1 according to an embodiment of the present disclosure.

FIG. 1 is a diagram depicting an example of a configuration and a use state of a tablet terminal 1 according to the embodiment of the present disclosure. The tablet terminal 1 is an information processing device configured to receive input by a stylus P, and is configured to have a panel surface 2 that serves as a display surface and a touch surface. The input method using the stylus P is not limited and may include, for example, an active capacitive method (AES) or an electromagnetic induction method (EMR). Hereinafter, the description will be given on the assumption that the active capacitive method is used.

Figure 2:
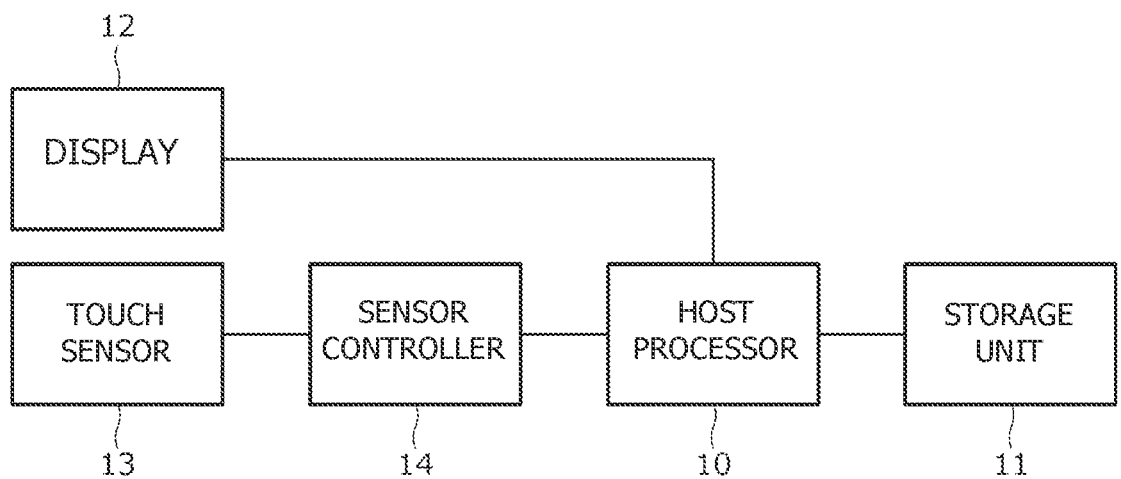
FIG. 2 is a diagram depicting an internal configuration of the tablet terminal 1.

FIG. 2 is a diagram depicting an internal configuration of the tablet terminal 1. As depicted in the drawing, the tablet terminal 1 is configured to have a host processor 10, a storage unit 11, a display 12, a touch sensor 13, and a sensor controller 14.

The host processor 10 is a central processing unit of the tablet terminal 1, and is responsible for executing an operating system of the tablet terminal 1 and various types of applications such as drawing software by executing a program stored in the storage unit 11. The drawing software has a function of generating a file for storing ink data in the storage unit 11, and a function of generating stroke data on the basis of coordinates and data sequentially supplied from the sensor controller 14 between pen-down and pen-up, to be described later, to sequentially perform rendering to display the same on the display 12 while writing the generated stroke data in the storage unit in association with each other as a series of ink data. The drawing software also has a function of extracting the generated ink data from the storage unit 11 to be rendered and displayed on the display 12.

The storage unit 11 includes a main storage device including, for example, a DRAM (Dynamic Random Access Memory) and an auxiliary storage device including, for example, a flash memory or a hard disk. A program executed by the host processor 10 is pre-stored in the storage unit 11, and various types of data used or generated by the host processor 10 are also stored therein. The data includes, in addition to the above-described ink data, identification information of the tablet terminal 1, login information for logging in to the above-described operating system or the various types of applications, and the like.

The display 12 is a device for visually outputting a result of a process by the host processor 10, and includes, for example, a liquid crystal display or an organic electroluminescence (EL) display.

The touch sensor 13 is a device having a plurality of sensor electrodes arranged over the entire panel surface 2 depicted in FIG. 1. The plurality of sensor electrodes includes a plurality of X electrodes each extending in a Y direction and a plurality of Y electrodes each extending in an X direction. In the tablet terminal 1 called an "in-cell type," common electrodes arranged in the display 12 may be used as the plurality of X electrodes.

The sensor controller 14 is an integrated circuit that uses the touch sensor 13 to detect positions of the stylus P and fingers within the panel surface 2 and to receive data transmitted by the stylus P. The data received from the stylus P includes a pen pressure value indicating a pressure applied to the pen tip of the stylus P, a pen identification (ID) pre-assigned to each stylus P, and the like. Regarding the pen pressure value, the sensor controller 14 is configured to detect that the stylus P has come into contact with the panel surface 2 (pen-down) and that the stylus P has been separated from the panel surface 2 (pen-up), on the basis of the pen pressure value received from the stylus P. The sensor controller 14 sequentially supplies coordinates indicating a detected position, received data, and pen-down or pen-up information to the host processor 10.

The drawing software executed in the host processor 10 is configured to generate stroke data on the basis of various types of data supplied from the sensor controller 14, and to store the generated stroke data in association with a series of previously generated ink data in the storage unit 11. Regarding input by the stylus P in particular, the drawing software is configured to generate stroke data by arranging a series of coordinates and pen pressure values supplied from the sensor controller 14 in a time series between pen-down and pen-up, and to store the generated stroke data in association with the series of ink data in correspondence with user information indicating the user who has input the stroke data. The concrete content of the user information may be a pen ID supplied from the sensor controller 14, identification information of the tablet terminal 1, or login information of the operating system or the drawing application.

The drawing software is also configured to extract the generated ink data from the storage unit 11 and render the data to be displayed on the display 12. In the rendering, for example, a predetermined interpolation curve such as a Catmull-Rom curve is used to complement coordinates among a series of coordinates. In addition, a pen pressure value is used to control a line width or transparency.

The description will be given by returning to FIG. 1. The character string of "patent aplication" depicted in the drawing is an example of a handwritten character string represented by the ink data. The tablet terminal 1 according to the embodiment is characterized in that a spelling error included in such a handwritten character string is automatically detected, and the ink data is automatically modified on the basis of the result. Hereinafter, this point will be described in detail.

Figure 3:
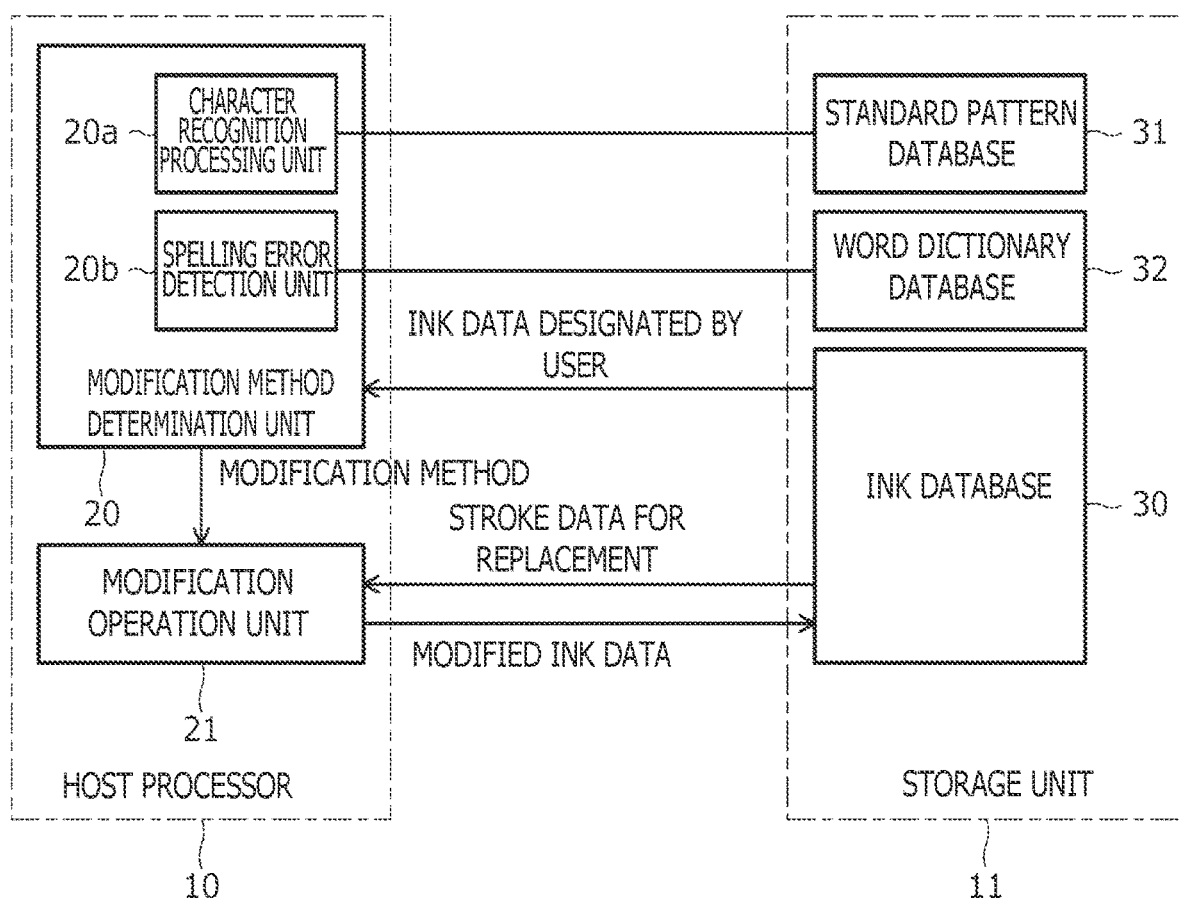
FIG. 3 is a diagram depicting functional blocks of a host processor 10 and data stored in a storage unit 11.

FIG. 3 is a diagram depicting functional blocks of the host processor 10 and data stored in the storage unit 11. In the drawing, only the parts related to the above feature are depicted.

As depicted in FIG. 3, the host processor 10 is functionally configured to have a modification method determination unit (circuit) 20 and a modification operation unit (circuit) 21. Among these units, the modification method determination unit 20 includes a character recognition processing unit 20a and a spelling error detection unit 20b. It should be noted that the modification method determination unit 20 and the modification operation unit 21 are preferably implemented as one of the functions in the above-described drawing software. In addition, the storage unit 11 stores an ink database 30, a standard pattern database 31, and a word dictionary database 32.

The ink database 30 is a database for accumulating the ink data generated by the host processor 10. The ink database 30 may accumulate not only the ink data generated by the host processor 10 of the tablet terminal 1 but also ink data generated by a host processor of another information processing device.

The modification method determination unit 20 is a functional unit that detects a spelling error included in the character string represented by the ink data stored in the ink database 30 to determine a modification method of the ink data. The ink data as a target for the spelling error detection is designated by, for example, a user. As a concrete process, the modification method determination unit 20 first executes a character recognition process by use of the character recognition processing unit 20a, so that text data indicating the character string represented by the ink data to be processed is acquired. Next, the modification method determination unit 20 detects a spelling error included in the acquired text data by use of the spelling error detection unit 20*b*. Then, an ink data modification method is finally determined on the basis of the content of the detected spelling error. Hereinafter, the details will be described.

The character recognition processing unit 20*a* is a functional unit that executes a character recognition process by use of the standard pattern database 31 by performing a process similar to what is generally called OCR (Optical Character Recognition). Specifically, when the ink data is input, the character recognition processing unit 20*a* first analyzes the layout thereof and segments lines and characters (including spaces). Next, the character recognition processing unit 20*a* extracts a feature value from each of the segmented characters.

The standard pattern database 31 pre-stores a standard pattern for each character of the above-described feature value. The character recognition processing unit 20*a* having extracted the feature value from each of the segmented characters selects one character for each of the segmented characters by checking the extracted feature value against the standard pattern in the standard pattern database 31. The character recognition processing unit 20*a* outputs a series of characters thus selected as text data indicating a character string represented by the ink data to be processed.

Here, the text data output from the character recognition processing unit 20*a* is preferably stored in the ink database 30 in association with the ink data to be processed. Thus, when the modification operation unit 21 acquires an additional stroke data group, to be described later, from the ink database 30, the additional stroke data group to be acquired can be determined on the basis of the text data stored in association with each ink data.

Next, the spelling error detection unit 20*b* is a functional unit that detects a spelling error included in the text data output from the character recognition processing unit 20*a* by use of the word dictionary database 32 in which data of words is pre-stored including combinations of one or more characters. Specifically, the spelling error detection unit 20*b* first divides the text data output from the character recognition processing unit 20*a* into words. This division may be performed on the basis of a space between the characters in the case of language such as English that is written with a space between words. On the other hand, in the case of language such as Japanese that is not written with a space between words, words may be extracted by performing a knowledge process based on the words stored in the word dictionary database 32 and divided on the basis of the result.

The spelling error detection unit 20*b* then determines, for each of one or more words obtained by the division, whether or not there is a matching or similar word in the word dictionary database 32. Here, the similarity between the two words means, for example, that the Levenshtein distance or the Jaro-Winkler distance between words is equal to or smaller than a predetermined value. In a case where there is a matching word for a certain word, the spelling error detection unit 20*b* concludes that the word includes no spelling error. In addition, also in a case where there is neither a matching word nor a similar word for a certain word, the spelling error detection unit 20*b* concludes that the word includes no spelling error. The reason for this conclusion is that the word is possibly a word such as a proper noun that is not listed in the dictionary. On the other hand, in a case where there is no matching word for a certain word but there is a similar word, the spelling error detection unit 20*b* concludes that the word includes a spelling error.

Figures 4A, 4B, 4C:
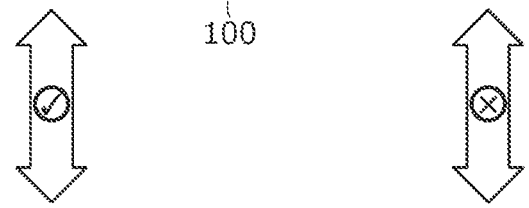
FIGS. 4A-4C are diagrams each depicting an example of a process executed by a spelling error detection unit 20b.

FIGS. 4A-4C are diagrams each depicting an example of the above process executed by the spelling error detection unit 20*b*. FIG. 4A depicts ink data, and FIG. 4B depicts text data output from the character recognition processing unit 20*a* on the basis of the ink data of FIG. 4A. FIG. 4B also depicts a word delimiter 100 obtained as a result of the above-described division of text data. FIG. 4C depicts words found in the word dictionary database 32 by the spelling error detection unit 20*b* for each portion of the text data of FIG. 4B divided by the delimiter 100.

As depicted in FIG. 4C, for the "patent" portion of the text data, the word "patent" that completely matches is found in the word dictionary database 32. Therefore, the spelling error detection unit 20*b* concludes that the word "patent" includes no spelling error. On the other hand, for the "aplication" portion of the text data, a completely matching word is not found in the word dictionary database 32, but a similar word "application" is found. Therefore, the spelling error detection unit 20*b* concludes that the word "aplication" includes a spelling error.

The description will be given by returning to FIG. 3. In the spelling error detected by the spelling error detection unit 20*b*, there may be three kinds of spelling errors such as a missing character, a superfluous character, and a typo. The missing character is a spelling error that a necessary character is missing, the superfluous character is a spelling error that an unnecessary character is mixed in, and the typo is a spelling error that a necessary character is replaced with a different character. The modification method determination unit 20 determines an ink data modification method on the basis of these detection results of the spelling errors. The modification method thus determined is to add a character in the case of the missing character, to delete a character in the case of the superfluous character, and to replace a character in the case of the typo.

Next, the modification operation unit 21 is a functional unit that modifies the ink data by manipulating the ink data on the basis of the modification method determined by the modification method determination unit 20. Hereinafter, the process performed by the modification operation unit 21 will be described in detail with reference to FIGS. 5 to 7.

FIGS. 5A-5C are diagrams each illustrating manipulation of the ink data to correct for a missing character. FIG. 5A depicts an example of the ink data to be processed. The ink data in this example is "patent aplication" depicted in FIG. 4A, and one "p" is missing when compared with "patent application" written in the correct spelling.

The modification method determined by the modification method determination unit 20 having received the input of the ink data depicted in FIG. 5A is, for example, to add "p" between "p" and "1" in "aplication." The modification operation unit 21 first selects, from the ink database 30 depicted in FIG. 3, one or more pieces of ink data input by the same user who has input the ink data to be processed. It should be noted that the ink data selected here may include ink data that is the current target of processing. Then, the modification operation unit 21 acquires one or more pieces of stroke data representing "p" that is a character to be added, from the one or more selected pieces of ink data. Hereinafter, the one or more pieces of stroke data thus acquired will be referred to as an "additional stroke data group." A character 101 depicted in FIG. 5C indicates the additional stroke data group thus acquired.

Next, the modification operation unit 21 determines a width X of the character 101 to be added on the basis of the size of each character configuring the ink data to be processed and the content of the character to be added. Then, among a plurality of characters represented by the ink data to be processed, those positioned on the right side in the same line as the insertion portion of the character 101 to be added are selected, and the selected one or more characters are moved to the right side on the basis of the determined width X. Specifically, in order to move the selected one or more characters to the right side by a distance corresponding to the width X, a numerical value corresponding to the moving distance is added to each of a series of coordinates included in the stroke data corresponding to the characters to be moved. It should be noted that a concrete moving distance of each stroke data in the manipulation may be a distance obtained by adding a predetermined adjustment value α to the width X as depicted in FIG. 5B, for example. Note that the adjustment value α may be a positive value, a negative value, or zero.

Next, the modification operation unit 21 adjusts the values of the series of coordinates configuring the additional stroke data group such that the rendering result of the ink data including the additional stroke data group becomes natural. Specifically, the values of the series of coordinates configuring the additional stroke data group are adjusted such that the character "p" displayed as a result of rendering the additional stroke data group is displayed, having the width X as determined, at the position determined by the modification method determination unit 20. The modification operation unit 21 may also adjust the insertion position of the additional stroke data group in a file configuring the ink data such that the order of reproduction becomes natural in a case where the ink data is automatically reproduced. The modification operation unit 21 having executed the adjustment adds the adjusted additional stroke data group to the ink data and concludes the manipulation of the ink data.

Here, in the case of English as in the example of FIGS. 5A-5C, a series of stroke data positioned on the right side of the portion into which the additional stroke data group is inserted is moved to the right side, but a method different therefrom can be employed depending on a language or a writing method. For example, in a language written from left to right such as Arabic, a series of stroke data positioned on the left side of the portion into which the additional stroke data group is inserted is moved to the left side. In addition, in Japanese written vertically, a series of stroke data positioned on the lower side of the portion into which the additional stroke data group is inserted is moved to the lower side.

Figure 6A:
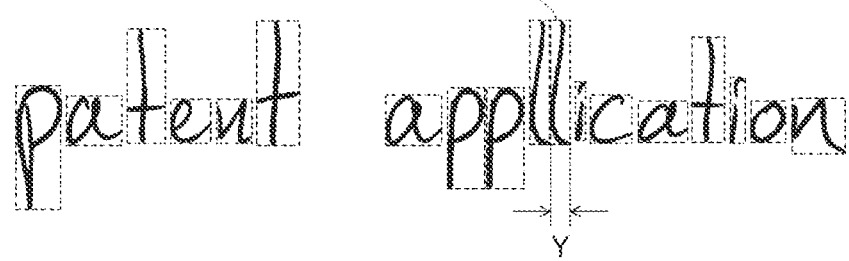
FIGS. 6A-6C are diagrams each illustrating manipulation of the ink data to correct for a superfluous character.
Figure 6B:
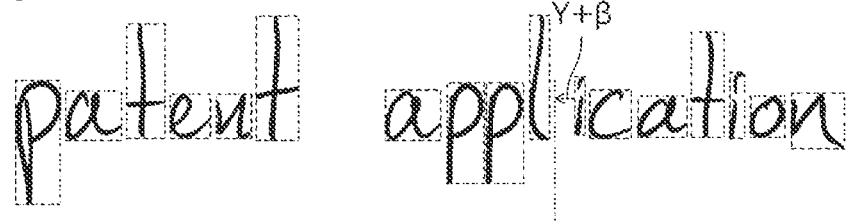
Figure 6C:

FIGS. 6A-6C are diagrams each illustrating manipulation of the ink data to correct for a superfluous character. FIG. 6A depicts ink data to be processed according to this example. The ink data is "patent appllicationapplication," and one unnecessary "l" is added when compared with "patent application" written in the correct spelling. In FIG. 6A, a character 102 corresponds to "l."

The modification method determined by the modification method determination unit 20 having received the input of the ink data depicted in FIG. 6A is to delete one "l" in the "appllication." The modification operation unit 21 first acquires a width Y of the character "l" to be deleted in the ink data to be processed. Then, as depicted in FIG. 6B, one or more pieces of stroke data corresponding to the character "l" to be deleted are deleted from a plurality of pieces of stroke data configuring the ink data.

Thereafter, among the plurality of characters represented by the ink data to be processed, the modification method determination unit 20 selects those positioned on one side (the right side in the example of FIG. 6B) in the same line as the deleted character "l," and moves the selected one or more characters to the left side on the basis of the width Y. Specifically, in order to move the selected one or more characters to the left side by a distance corresponding to the width Y, a numerical value corresponding to the moving distance is subtracted from each of a series of coordinates included in the stroke data corresponding to the characters to be moved. It should be noted that a concrete moving distance of each character in the manipulation may be a distance obtained by adding a predetermined adjustment value β to the width Y, as depicted in, for example, FIG. 6B. Note that the adjustment value β may be a positive value, a negative value, or zero. The modification operation unit 21, having completed the process so far, terminates the manipulation of the ink data.

Here, in the case of English as in the example of FIGS. 6A-6C, the stroke data positioned on the right side of the deleted character is moved to the left side, but a method different therefrom can be employed depending on a language or a writing method. For example, in a language written from left to right such as Arabic, the stroke data positioned to the left side of the deleted character is moved to the right side. In addition, in Japanese written vertically, the stroke data positioned on the lower side of the deleted character is moved to the upper side.

Figure 7A:
FIGS. 7A-7E are diagrams each illustrating manipulation of the ink data to correct a typo.

FIGS. 7A-7E are diagrams each illustrating manipulation of the ink data to correct a typo. FIG. 7A depicts ink data to be processed according to this example. The ink data is "patent applecation," and "i" after "appl" is replaced with "e" when compared with "patent application" written in the correct spelling. In FIG. 7A, a character 103 corresponds to "e."

Figure 7B:
Figure 7C:
Figure 7D:

The modification method determined by the modification method determination unit 20 having received the input of the ink data depicted in FIG. 7A is to replace "e" in "applecation" with "i." The modification operation unit 21 having received the determination first executes the same manipulation of the ink data as described with reference to FIGS. 6A-6C, with "e" as the target to be deleted as depicted in FIG. 7A to FIG. 7C. Next, the modification operation unit 21 executes the same manipulation of the ink data as described with reference to FIGS. 5A-5C such that "i" is added between "l" and "c" as depicted in FIG. 7C to FIG. 7E.

Figure 7E:
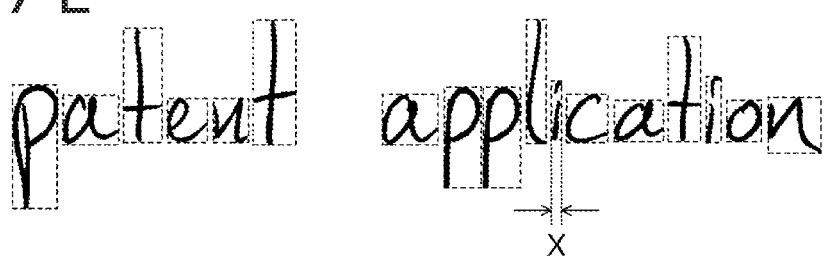

As a result of executing these operations, the replacement of "e" in "applecation" with "i" is realized as depicted in FIG. 7E. As described above, the manipulation of the ink data for correcting a typo includes a combination of the manipulation of the ink data to correct for a superfluous character and the manipulation of the ink data to correct for a missing character.

Next, the process of the host processor 10 described above will be described again in more detail from another point of view by referring to a processing flow of the host processor 10.

Figure 8:
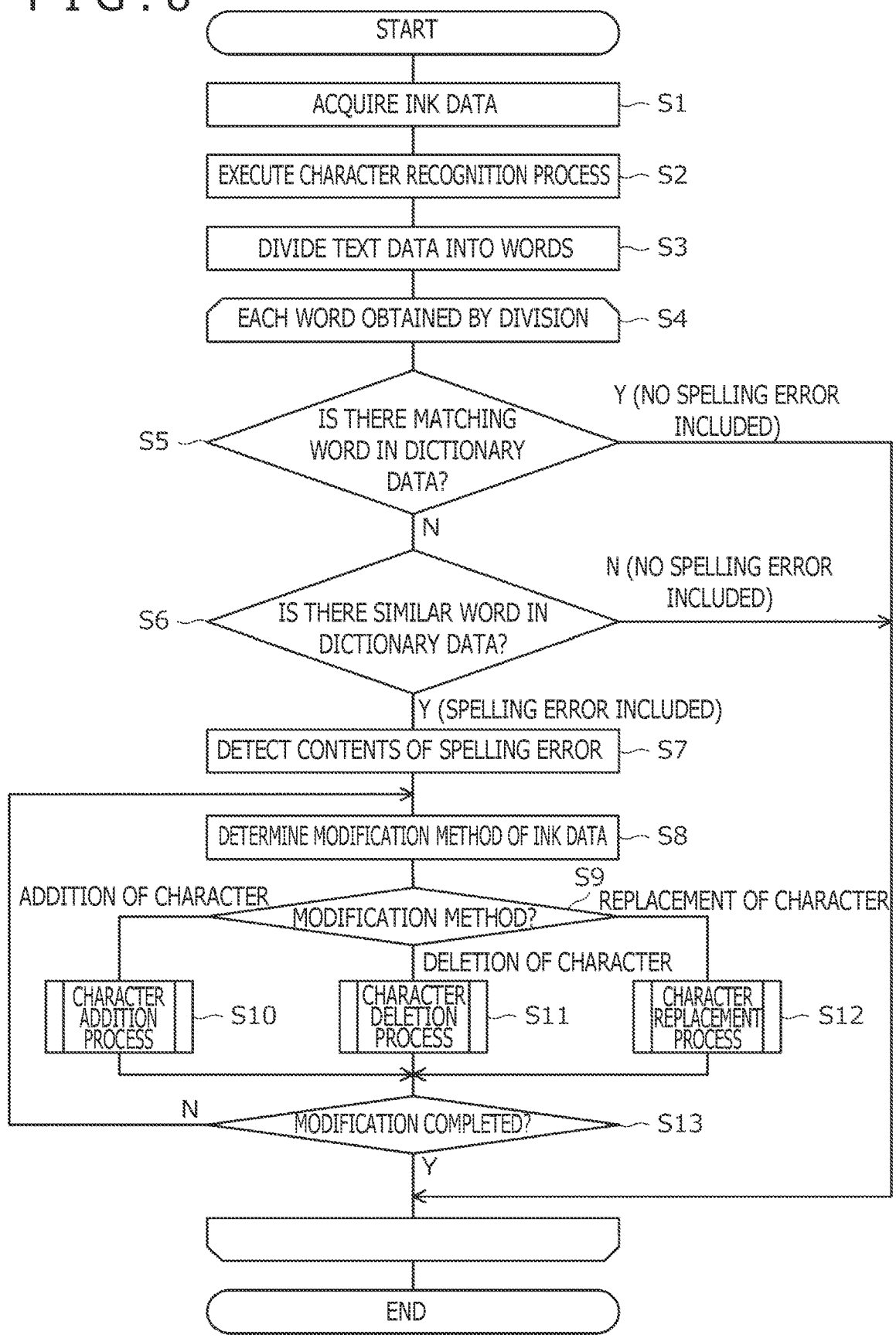
FIG. 8 is a flowchart depicting the overall flow of an ink data modification process executed by the host processor 10.

FIG. 8 is a flowchart depicting the overall flow of the ink data modification process executed by the host processor 10. As depicted in the drawing, the host processor 10 first acquires ink data from the ink database 30 (Step S1), and executes a character recognition process (Step S2). The details of the character recognition process are as described above.

Next, the host processor 10 divides text data obtained by the character recognition process into words (Step S3). The details of the dividing process are as described above. Thereafter, the host processor 10 executes the processes of Steps S5 to S13 for each word in the text data obtained by the division of Step S3 (Step S4).

Specifically, the host processor 10 first determines whether or not there is a matching word in the word dictionary database 32 depicted in FIG. 3 (Step S5). As a result, if present, the host processor 10 concludes that there is no spelling error and proceeds to the process for the next word. On the other hand, if not present, the host processor 10 further determines whether or not there is a similar word in the word dictionary database 32 (Step S6). The meaning of the similarity herein is as described above. In a case where it is determined to be not present in Step S6, the host processor 10 concludes that there is no spelling error and proceeds to the process for the next word. On the other hand, in a case where a similar word is determined to be present, the host processor 10 compares the word to be processed with the similar word in the word dictionary database 32 to detect the content of the spelling error included in the word to be processed (Step S7). As described above, the spelling error thus detected may include three kinds of spelling errors such as a missing character, a superfluous character, and a typo.

Next, the host processor 10 determines an ink data modification method on the basis of the content of the spelling error detected in Step S7 (Step S8). Here, the content of the spelling error detected in Step S7 is not limited to only one type. In a case where a word contains a plurality of spelling errors, the host processor 10 selects one of them and determines a modification method for modifying the selected spelling error.

Next, the host processor 10 determines whether the modification method determined in Step S8 is an addition of a character, a deletion of a character, or a replacement of a character (Step S9). As a result, a character addition process (Step S10) is executed in the case of the addition of a character, a character deletion process (Step S11) is executed in the case of the deletion of a character, and a character replacement process (Step S12) is executed in the case of the replacement of a character. The details of these processes will be described later with reference to FIG. 9 to FIG. 11.

The host processor 10 having completed one of Steps S10 to S12 determines whether or not the modification (correction) of all the spelling errors included in the word to be processed has been completed (Step S13), and in a case where it is determined to have not been completed, the host processor 10 returns to Step S8 to modify the remaining spelling errors. On the other hand, in a case where it is determined to have been completed, the host processor 10 proceeds to the process for the next word. In a case where the process for all of the words in the text data obtained by the division in Step S3 has been completed, the host processor 10 terminates the ink data modification process.

FIG. 9 is a flowchart depicting details of the character addition process (Step S10) depicted in FIG. 8. The host processor 10 that executes this process first selects one or more pieces of ink data, which are generated by the same user that has input the ink data to be processed (i.e., the ink data acquired in Step S1 of FIG. 8), from the ink database 30, and acquires the above-described additional stroke data group from the selected one or more pieces of ink data (Step S20).

Next, the host processor 10 determines the width X of the character to be added on the basis of the size of each character configuring the ink data to be processed and the content of the character to be added (Step S21). Next, the host processor 10 selects, among a plurality of characters represented by the ink data to be processed, those positioned on the right side in the same line as the insertion portion of the character to be added (Step S22), and manipulates the ink data such that the selected one or more characters move to the right side by a distance (specifically, the distance X+α depicted in FIG. 5B) corresponding to the width X (Step S23). The details of the manipulation are as described above.

Next, the host processor 10 adjusts the values of a series of coordinates configuring the additional stroke data group such that the rendering result of the ink data with the additional stroke data group added becomes natural (Step S24). The details of the adjustment process are as described above. Thereafter, the host processor 10 adds the adjusted additional stroke data group to the ink data (Step S25), and terminates the character addition process.

FIG. 10 is a flowchart depicting details of the character deletion process (Step S11) depicted in FIG. 8. The host processor 10 that executes the process first derives the width Y of the character to be deleted in the ink data to be processed (Step S30). Thereafter, the host processor 10 deletes one or more pieces of stroke data corresponding to the character to be deleted from the ink data to be processed (Step S31).

Next, the host processor 10 selects, among a plurality of characters represented by the ink data to be processed, those positioned on the right side in the same line as the deleted character (Step S32). Then, the ink data to be processed is manipulated such that the selected one or more characters move to the left side by a distance (specifically, the distance Y+β depicted in FIG. 6B) corresponding to the width Y (Step S33). The details of the manipulation are as described above. Upon completion of Step S33, the host processor 10 terminates the character deletion process.

Figure 11:
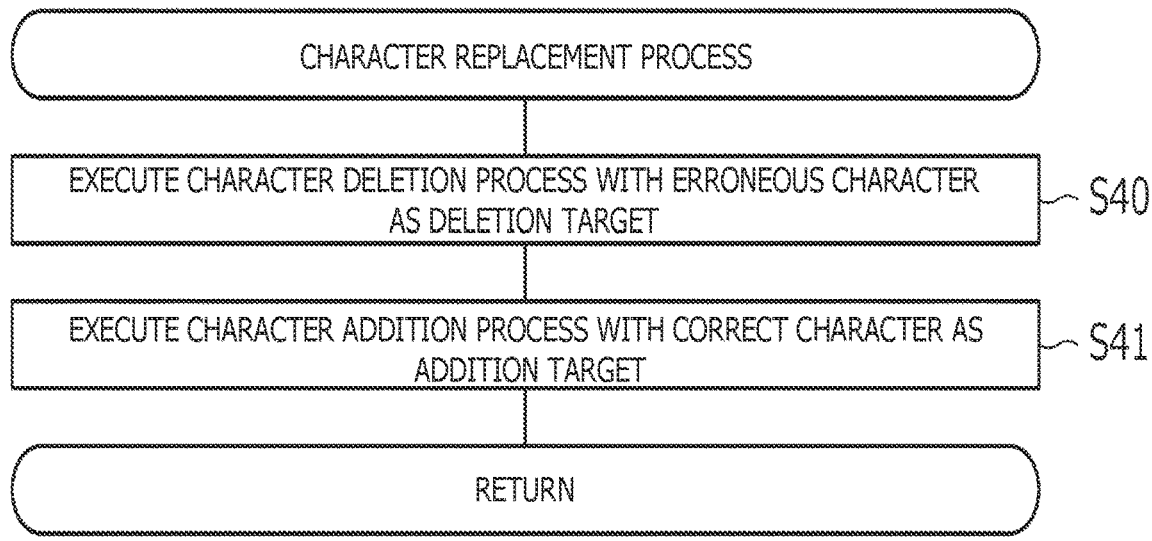
FIG. 11 is a flowchart depicting details of a character replacement process depicted in FIG. 8.

FIG. 11 is a flowchart depicting details of the character replacement process (Step S12) depicted in FIG. 8. As depicted in the drawing, this process is a combination of the character deletion process and the character addition process. Specifically, the host processor 10 first executes the character deletion process depicted in FIG. 10 with an erroneous character as the deletion target (Step S40). Accordingly, the erroneous character is deleted from the ink data to be processed, and the space created by the deletion is to be filled. Next, the host processor 10 executes the character addition process depicted in FIG. 9 such that the correct character is added at the position where the erroneous character is deleted (Step S41). Accordingly, the correct character is inserted at the position where the typo of the ink data to be processed is deleted. After the completion of Step S41, the host processor 10 terminates the character replacement process.

As described above, according to the ink data modification method, the information processing device, and the program according to the embodiment, a spelling error included in the character string represented by the ink data can be automatically detected, and the ink data can be modified on the basis of the result. Therefore, the ink data including a spelling error can automatically be modified and corrected.

In addition, in a case where the modification of adding a character is performed, the additional stroke data group is acquired from the ink data that has been input in the past by the same user who has input the ink data to be processed, and thus characters having different handwriting characteristics from other parts are not mixed into the ink data.

Further, since the values of a series of coordinates configuring the additional stroke data group are adjusted so that the rendering result of the ink data with the additional stroke data group added becomes natural and the additional stroke data group is then added to the ink data, a natural rendering result can be obtained even after the modification.

Although the preferred embodiment of the present disclosure has been described above, it is obvious that the present disclosure is not limited to such an embodiment in any way, and the present disclosure can be carried out in various modes without departing from the gist thereof.

For example, it has been described in FIG. 3 that one or more pieces of ink data, which have been input by the same user who has input the ink data to be processed, are selected from the ink database 30, but the ink data selected from the ink database 30 need not necessarily be input by the same user.

In addition, it has been described that the modification method determination unit 20 depicted in FIG. 3 executes the character recognition process by use of the character recognition processing unit 20a, such that text data indicating the character string represented by the ink data to be processed is acquired, but the text data need not necessarily be acquired. That is, by executing the character recognition process by use of the character recognition processing unit 20a in the modification method determination unit 20, the size, inclination, and the like of a handwritten character string represented by the ink data to be processed may be corrected to normalize the handwritten character string, and the normalized handwritten character string may be registered in the storage unit 11 in place of the text data. Thus, the spelling error detection unit 20b in the modification method determination unit 20 can detect a spelling error included in the acquired handwritten character string by using the handwritten character string itself as a target.

Figure 12:
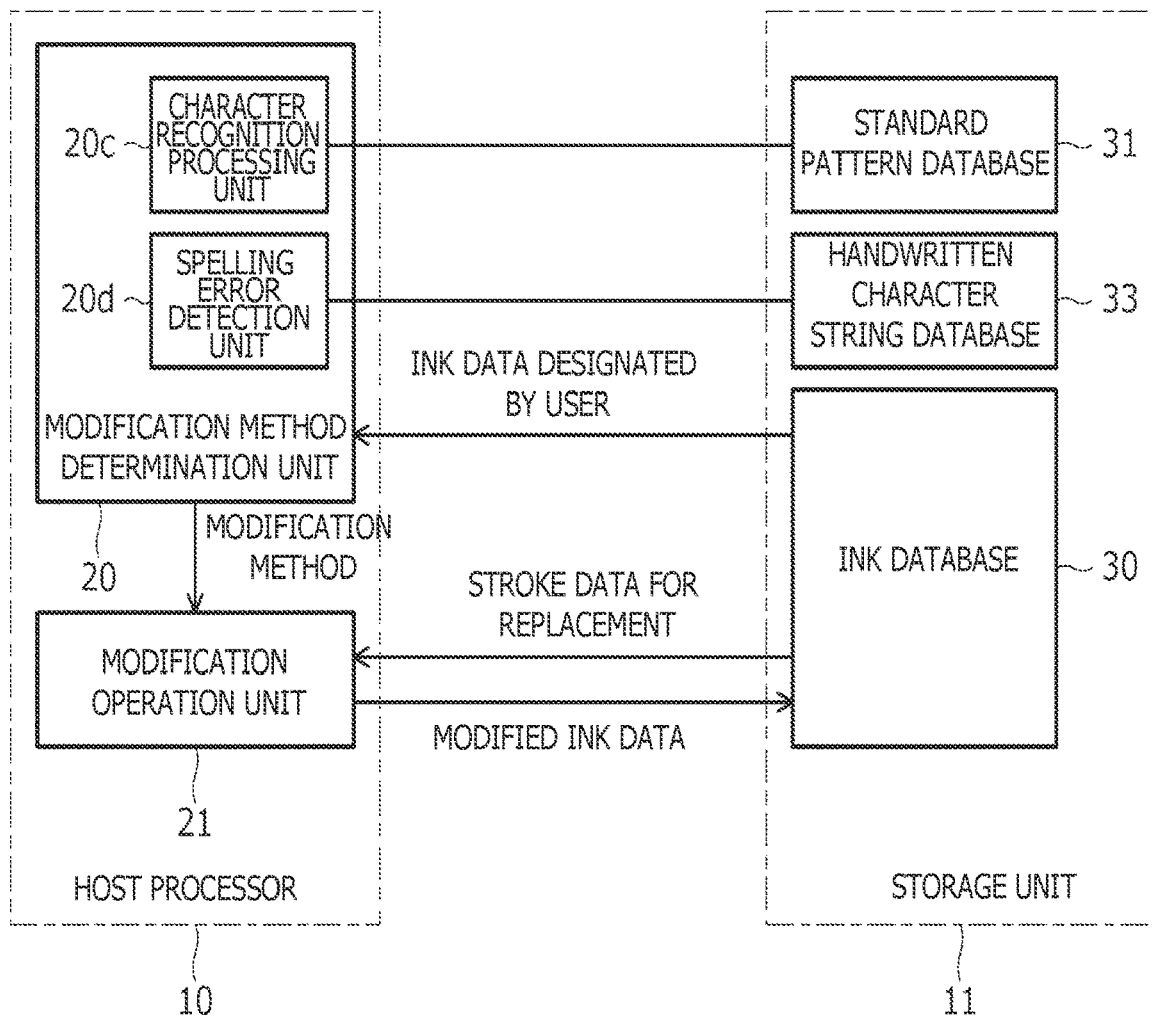
FIG. 12 is a diagram depicting functional blocks of a host processor 10 and data stored in a storage unit 11 according to a modified example of the embodiment of the present disclosure.

FIG. 12 is a diagram depicting functional blocks of a host processor 10 and data stored in a storage unit 11 according to a modified example of the above-described embodiment configured as described above. As depicted in the drawing, the host processor 10 according to the modified example has a character recognition processing unit 20c in place of the character recognition processing unit 20a, and a spelling error detection unit 20d in place of the spelling error detection unit 20b. In addition, the storage unit 11 has a handwritten character string database 33 in place of the word dictionary database 32.

The handwritten character string database 33 is a database for storing normalized handwritten character strings. The handwritten character string database 33 is configured to store examples of handwritten character strings for as many words as possible.

The character recognition processing unit 20c normalizes a character string by executing the character recognition process for the ink data as a target for the spelling error detection. Specifically, the character recognition processing unit 20c first performs the same process as the character recognition processing unit 20a to segment lines and characters and select one character for each of the segmented characters. Then, the segmented character is shaped so as to be close to a shape expected as the shape of the selected character (that is, the shape of the character stored in the handwritten character string database 33). This shaping includes the correction of inclination and the like as described above. In addition, the size of each character after the shaping is adjusted such that, for example, the sizes of the segmented characters are equal to each other.

The spelling error detection unit 20d detects a spelling error by comparing the shaped handwritten character string output from the character recognition processing unit 20c with the handwritten character string registered in the handwritten character string database 33. Specifically, the spelling error detection unit 20d first divides the handwritten character string output from the character recognition processing unit 20c into words. This process may be the same process as the division of text data performed by the spelling error detection unit 20b. Then, for each of one or more words obtained by the division, it is determined whether or not there is a matching or similar handwritten character string in the handwritten character string database 33. In a case where there is a matching handwritten character string for a certain word, the spelling error detection unit 20d concludes that the word includes no spelling error. In addition, in a case where there is neither a matching handwritten character string nor a similar handwritten character string for a certain word, the spelling error detection unit 20d concludes that the word includes no spelling error. On the other hand, in a case where there is no matching handwritten character string for a certain word but there is a similar handwritten character string, the spelling error detection unit 20d concludes that the word includes a spelling error. The processes of the modification method determination unit 20 and the modification operation unit 21 having received this conclusion are as described in the above embodiment.

As described above, according to the modified example, the ink data including a spelling error can automatically be modified without acquiring the text data in the same manner as in the above embodiment.

In addition, in a handwritten character string, a series of characters may be connected or joined with each other in some cases as in the case of a cursive style writing in English, for example. Accordingly, when the additional stroke data group is added to the ink data, the modification operation unit 21 may determine two pieces of stroke data to be connected after the addition, and may deform the shape(s) (including the position(s) and/or thickness(es)) of one or both of the two pieces of stroke data so that the determined two pieces of stroke data are connected to each other. As similar to the above, when one or more pieces of stroke data are deleted and characters positioned on one side in the same line as the deleted character are moved to the other side, two pieces of stroke data to be connected to each other may be determined after the moving operation is performed, and the shape(s) (including the position(s) and/or thickness(es)) of one or both of the two pieces of stroke data may be deformed such that the determined two pieces of stroke data are connected to each other. In this way, it is possible to realize a continuous stroke in which a series of characters can be connected to each other.

In addition, at least one of the ink database 30, the standard pattern database 31, and the word dictionary database 32 depicted in FIG. 3 and the handwritten character string database 33 depicted in FIG. 12 may be connected to the host processor 10 via a network.

Further, some or all of the processes performed by the host processor 10 depicted in FIG. 3 may be executed via a network by use of, for example, a cloud computing technology.

DESCRIPTION OF REFERENCE SYMBOLS

1 Tablet terminal
2 Panel surface
10 Host processor
11 Storage unit
12 Display
13 Touch sensor
14 Sensor controller
20 Modification method determination unit
20a, 20c Character recognition processing unit
20b, 20d Spelling error detection unit
21 Modification operation unit
30 Ink database 31 Standard pattern database
32 Word dictionary database
33 Handwritten character string database
101 Character to be added
102 Character to be deleted
103 Character to be replaced
P Stylus
X, Y Width
α,β Adjustment value

The invention claimed is:

1. An ink data modification method for processing a handwritten character string, the method comprising:
   generating ink data including plural units of stroke data, the ink data representing the handwritten character string, and each unit of stroke data representing one character of the handwritten character string,
   executing a character recognition process on the ink data to extract normalized text indicative of the handwritten character string,
   comparing the normalized text with pre-registered character strings to detect a spelling error in the normalized text,
   determining a modification method of correcting the detected spelling error in the handwritten character string of the ink data; and
   modifying the handwritten character string to correct the spelling error, by manipulating the plural units of stroke data in the ink data, per unit of stroke data, on a basis of the determined modification method.

2. The ink data modification method according to claim 1, wherein the modification method is to add a character, and
   the manipulation of the plural units of stroke data in the ink data includes adding one unit of stroke data representing the character to be added to the plural units of stroke data to form the handwritten character string.

3. The ink data modification method according to claim 2, wherein, the one unit of stroke data representing the character to be added is input by a user who has input the ink data.

4. The ink data modification method according to claim 3, wherein the manipulation of the plural units of stroke data in the ink data includes determining a width of the character to be added and moving, among a plurality of characters forming the handwritten character string, those positioned on one side of a portion into which the character to be added is inserted to the one side according to the determined width.

5. The ink data modification method according to claim 2, wherein the manipulation of the plural units of stroke data in the ink data includes determining two units of stroke data to be connected to each other after adding the character, and deforming a shape of one or both of the two units of stroke data to connect the two units of stroke data representative of two characters of the handwritten character string together.

6. The ink data modification method according to claim 1, wherein the modification method is to delete a character, and
   the manipulation of the plural units of stroke data in the ink data includes deleting one unit of stroke data corresponding to the character to be deleted from the plural units of stroke data forming the handwritten character string.

7. The ink data modification method according to claim 6, wherein the manipulation of the plural units of stroke data in the ink data includes an operation of moving, among a plurality of characters forming the handwritten character string, those positioned on one side of the deleted character to the other side, on a basis of a width of the deleted character.

8. The ink data modification method according to claim 7, wherein the manipulation of the plural units of stroke data in the ink data includes determining two units of stroke data to be connected to each other after performing the operation of moving, and deforming a shape of one or both of the two units of stroke data to connect the two units of stroke data representative of two characters of the handwritten character string together.

9. The ink data modification method according to claim 1, wherein the modification method is to replace a character, and
   the manipulation of the plural units of stroke data in the ink data includes:
      deleting, from the plural units of stroke data forming the ink data, one unit of stroke data corresponding to the character to be replaced, and
      adding one unit of stroke data representing a correct character to a portion of the deleted character forming the handwritten character string.

10. The ink data modification method according to claim 9, wherein, the one unit of stroke data representing the correct character is input by a user who has input the ink data.

11. The ink data modification method according to claim 10,
    wherein the manipulation of the plural units of stroke data in the ink data includes:
       moving, among a plurality of characters forming the handwritten character string, those positioned on one side of the deleted character to the other side, on a basis of a width of the deleted character, and
       determining a width of the correct character and moving, among the plurality of characters forming the handwritten character string, those positioned on one side of a portion into which the correct character is inserted to the one side according to the determined width of the correct character.

12. An information processing device, comprising:
    a modification method determination circuit configured to determine a modification method of ink data by detecting a spelling error included in a handwritten character string represented by the ink data,
    wherein the ink data includes plural units of stroke data, each unit of stroke data representing one character of the handwritten character string; and
    a modification operation circuit configured to modify the handwritten character string to correct the detected spelling error, by manipulating the plural units of stroke data in the ink data, per unit of stroke data, on a basis of the determined modification method.

13. The information processing device according to claim 12, wherein the modification method determination circuit acquires text data indicating the handwritten character string by executing a character recognition process, and detects the spelling error in the text data.

14. A non-transitory computer program that causes an information processing device to perform:
    determining a modification method of ink data by detecting a spelling error included in a handwritten character string represented by the ink data,
    wherein the ink data includes plural units of stroke data, each unit of stroke data representing one character of the handwritten character string; and modifying the handwritten character string to correct the detected spelling error, by manipulating the plural units of stroke data in the ink data, per unit of stroke data, on a basis of the determined modification method.

15. The non-transitory computer program according to claim 14, which causes the information processing device to perform:
acquiring text data indicating the handwritten character string by executing a character recognition process; and
detecting the spelling error in the text data.

* * * * *